(12) United States Patent
Sand et al.

(10) Patent No.: US 8,327,698 B2
(45) Date of Patent: Dec. 11, 2012

(54) TEST DEVICE FOR THE FAN OF AN AIRCRAFT ENGINE

(75) Inventors: Stefan Sand, Berlin (DE); Edmund Ahlers, Zeesen (DE); Carsten Heydorn, Mittenwalde (DE); Carsten Daum, Berlin (DE); André Steinborn, Königs Wusterhausen OT Zeesen (DE); Ian Hobson, Nuneaton (GB); Axel Riepe, Berlin (DE)

(73) Assignee: AneCom Aero Test GmbH, Wildau (DE)

( * ) Notice: Subject to any disclaimer, the term of this patent is extended or adjusted under 35 U.S.C. 154(b) by 25 days.

(21) Appl. No.: 13/062,837

(22) PCT Filed: Jul. 13, 2009

(86) PCT No.: PCT/EP2009/058926
§ 371 (c)(1),
(2), (4) Date: May 26, 2011

(87) PCT Pub. No.: WO2010/028881
PCT Pub. Date: Mar. 18, 2010

(65) Prior Publication Data
US 2011/0219862 A1 Sep. 15, 2011

(30) Foreign Application Priority Data
Sep. 9, 2008 (DE) .......................... 10 2008 041 916

(51) Int. Cl.
*G01M 15/14* (2006.01)
(52) U.S. Cl. ................................................... 73/116.03
(58) Field of Classification Search ............... 73/112.01, 73/116.03
See application file for complete search history.

(56) References Cited

U.S. PATENT DOCUMENTS
4,537,066 A * 8/1985 Simpson .................... 73/116.03
(Continued)

FOREIGN PATENT DOCUMENTS
DE 1698128 3/1972

OTHER PUBLICATIONS

Khaletskiy, Y. et al., "Acoustic Test Facility for AeroEngine Fans," Acoustics 08 Paris Programme, Jul. 1, 2008, pp. 1835-1838.

(Continued)

*Primary Examiner* — Freddie Kirkland, III
(74) *Attorney, Agent, or Firm* — Seager, Tufte & Wickhem, LLC

(57) ABSTRACT

The fundamental idea of the invention consists of the construction of the test device from a stationary inner basic structure (1, 7 to 11) that juts out from the wall of the test bench and houses the drive shaft (13) for the fan to be tested, from mobile, interchangeable external housing modules (18 to 24) which can be aligned in relation to one another by means of connected optical elements (32, 33), from interchangeable fittings (41 to 44, 48) for conducting air and noise reduction, in addition to interchangeable measuring devices (38 to 40) that are connected to a modular telemetry unit for determining performance data and aerodynamic and acoustic conditions required by the fan and the fittings. A test device that is designed on this basis permits a plurality of data that is influenced by the design of the fan and the fittings, which lie in the flow duct behind the fan, to be recorded using relatively simple structural resources and conclusions can be drawn from said data with regard to the reduction of noise, an optimal aerodynamic design and improved performance.

11 Claims, 1 Drawing Sheet

U.S. PATENT DOCUMENTS

| | | | | |
|---|---|---|---|---|
| 5,293,775 | A * | 3/1994 | Clark et al. | 73/116.03 |
| 6,487,909 | B2 * | 12/2002 | Harrold et al. | 73/593 |
| 6,497,137 | B2 * | 12/2002 | Helgeson | 73/23.31 |
| 7,938,017 | B2 * | 5/2011 | Bisgaard | 73/856 |
| 2009/0173148 | A1 * | 7/2009 | Jensen | 73/116.03 |

OTHER PUBLICATIONS

Internet: "AneCom AeroTest—Aerospace and Gas Turbine Development and Test Services," Berlin Aerospace-technology, Mar. 11, 2006, URL: http://web.archive.org/web/20060311194218/http://www.aerospace-technology.com/contractors/manufacturing/anecom/, 2 sheets.

Julliard, J. et al., "Active Control of the Directivity of Fan Tones Noise," Snecma Villaroche Moissy-Cramayel (France) Departement Acoustique, Paper presented at the RTO AVT Syposium on "Active Control Technology for Enhanced Performance Operational Capabilities of Military Aircraft, Land Vehicles and Sea Vehicles", held in Braunschweig, Germany, May 8-11, 2000, and published in RTO MP-051, pp. 18-1 through 18-10.

Mueller, D. et al., "Europe's Largest Aero Acoustic Test Facility for Aero Engine Fans—The Development and Operation of the AneCom Aerotest Anechoic Chamber," 11th AIAA/CEAS Aeroacoustics Conference (26th AIAA Aeroacoustics Conference) May 25, 2005, Monterey, CA, 1 sheet.

Hughes, C.E. et al., "Fan Noise Source Diagnostic Test—Rotor Alone Aerodynamic Performance Results," 8th AIAA/CEAS Aeroacoustics Conference & Exhibit, Jun. 17-19, 2002, Breckinridge, CO, 28 sheets.

Shook, Tony D. et al., "Design and Integration of a Rotor Alone Nacelle for Acoustic Fan Testing," 39th Aerospace Sciences Meeting and Exhibit sponsored by the American Institute of Aeronautics and Astronautics, Reno, Nevada, Jan. 8-11, 2001, 11 sheets.

* cited by examiner

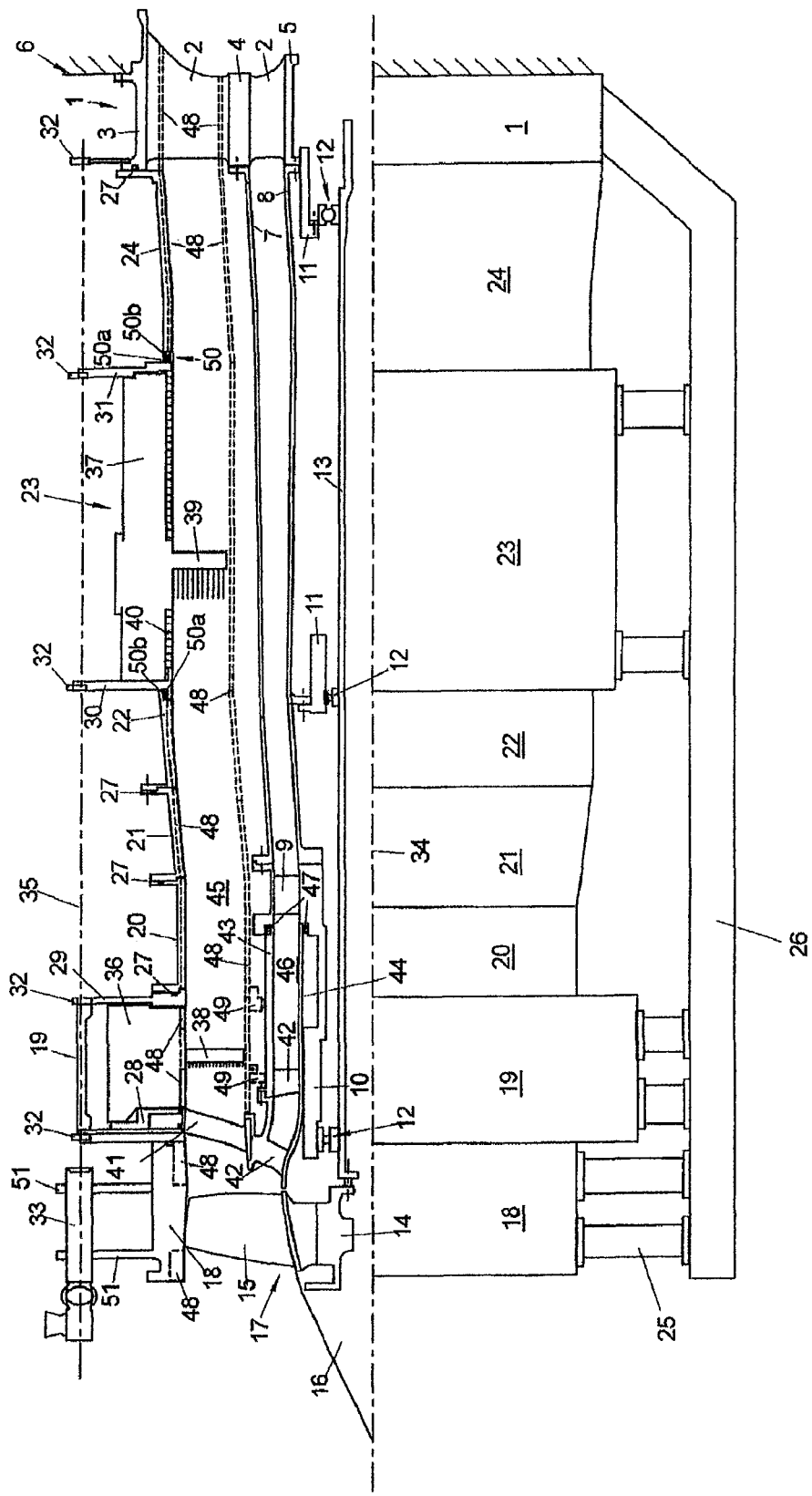

TEST DEVICE FOR THE FAN OF AN AIRCRAFT ENGINE

The invention relates to a test device for the fan of an aircraft engine for determining the acoustic and aerodynamic behavior and the performance data, said test device comprising an outer housing which is attached on the end side to a test stand wall and is intended for receiving the fan and a drive shaft connected to the latter, and measuring means.

An essential objective in the development and production of aircraft engines is that of reducing noise emission. The engine fan which generates the substantial part of the engine thrust is at the same time one of the main noise sources of an engine, and therefore the investigations which are directed to reducing the noise emission are concentrated on the fan and the operating behavior thereof and acoustic effects. The noise brought about by the fan is radiated outward firstly via the air inlet on the fan housing and secondly via the air outlet of the bypass duct, with a substantial cause of the noise emission generated downstream of the fan being caused by the interaction with the internal components, in particular the guide vanes, arranged in the flow duct downstream of the fan.

Investigations to establish the noise emission emanating from a fan are customarily carried out using a test device which has an outer housing which is fixedly installed on the wall of a test stand and is adapted to the particular fan. The fan drive shaft, which is connected to a drive, is supported in a plurality of bearings on the outer housing. A testing arrangement of this type is disadvantageous insofar as acoustic investigations can generally only be carried out upstream of the fan due to the outer housing which is designed as a supporting structure. However, even in order to be able to investigate the effect of different engine fan configurations in that part of the flow duct which is located upstream of the fan and to be able to derive therefrom specific measures for reducing noise in the development of engines, extensive remodeling measures and, in many cases, for example in the case of fans of different engines, even completely new constructions of the test arrangement are required, said measures and constructions being associated with a high outlay in terms of time and cost. The outer housing flow duct which is located downstream of the fan in the direction of flow and acts as a supporting structure is not designed in a manner corresponding to the actual circumstances in an engine and therefore is not suitable for acoustic investigations. On the other hand, however, the design of the flow duct located downstream of the fan and of the internal components in said flow duct, for example the guide vanes and acoustic and aerodynamic liners, which design is actually provided in a customary fan jet engine, provides important starting points, which have hitherto been ignored, for investigating and reducing the noise emission.

The invention is based on the object of providing a test device for the fan of aircraft engines, the test device permitting investigation of the acoustic and aerodynamic effects of differently designed fans in conjunction with internal components arranged in the flow duct, the investigation being close to reality for different fan configurations and being associated with little structural outlay, and the development of engines having reduced noise emission.

According to the invention, the object is achieved by a test device designed according to the features of patent claim 1. Further features and expedient refinements of the invention are the subject matter of the dependent claims.

The basic concept of the invention consists in the design of the test device from a stationary, inner basic structure which protrudes from the test stand wall and in which the drive shaft of the fan which is to be tested is mounted, and from mobile and interchangeable outer housing modules, which can be aligned with respect to one another by connected optical means, interchangeable internal components for conducting air and reducing noise and interchangeable measuring means which are connected to a telemetry unit of modular design and are intended for determining performance data and the aerodynamic and acoustic behavior caused by the fan and the internal components. With a test device formed on this basis, a multiplicity of data influenced by the configuration of the fan and the internal components located downstream of the fan in the flow duct can be detected with comparatively little structural outlay and conclusions can be drawn from said data regarding the reduction in the noise emission, an optimum, aerodynamic configuration of the fan and of the internal components and an increase in performance.

The static basic structure for supporting the drive shaft of the fan under investigation in each case comprises a supporting housing which is fastened to the test stand wall, consists of three concentrically arranged supporting rings and has an outer and an inner supporting tube which are held in a protruding manner on the two inner supporting rings and the free ends of which are connected to one another by supporting vanes and are extended by a bearing structure. The drive shaft of the fan is supported via bearings on said bearing structure and on bearing rings located on the inner supporting tube.

The mobile interchangeable part of the test device comprises a plurality of outer housing modules which are connected to one another in a sealing and releasable manner and consist of a fan housing module surrounding the fan, at least one measuring housing module provided with measuring elements, and flow duct modules which are arranged between the measuring housing modules or a measuring housing module and the outer supporting ring of the supporting housing, which supporting ring is connected fixedly to the test stand wall.

The interchangeable measuring elements are sensors which are attached to a pivotable drum arranged in the measuring housing modules, are preferably held on a rake and are intended for detecting the noise emission and other flow-relevant data. Guide vanes for the bypass air flow and two concentrically arranged tube elements with guide vanes for forming the core flow duct are attached interchangeably to the outer housing module, which adjoins the fan housing module, in order to distribute and transfer the air flow generated by the fan. The guide vanes are therefore non-supporting structures which are fastened only to the outer housing irrespective of the mounting of the rotor.

An acoustic or aerodynamic liner can be arranged interchangeably in that part of the fan housing module which is located downstream of the fan and in the adjoining bypass flow duct—apart from that part of the second measuring housing module which is equipped with microphones. The liner is preferably designed in the form of half shells which are joined together in such a manner that disturbance-free air flow is ensured. Liners of this type can also be provided upstream of the fan on the inner circumferential surface of the fan housing module.

In order to ensure an exact concentric arrangement and alignment of the mobile outer housing modules, the fan housing module and the measuring housing modules which are arranged between the latter and the supporting housing are fastened adjustably in the X, Y and Z directions on bearing pillars arranged displaceably in rails, wherein the precise coaxial alignment of the adjustable outer housing modules takes place by means of precision telescopes fastened to the fan housing module and optical lenses attached to the front and rear flanges of the measuring housing modules and to the stationary supporting housing. The optical lenses and precision telescopes are preferably attached in pairs offset with respect to one another at a certain angle.

In order to compensate for axial and radial expansions caused by temperature, the flow duct modules adjoining a measuring housing module are mounted in a sliding seat with sealing elements which expand owing to prestressing of a spring.

An exemplary embodiment of the invention is explained in more detail with reference to the drawing, the single FIGURE of which shows a schematic illustration, partially reproduced in section, of a modularly designed test device for engine fans.

The test device firstly consists of a basic structure which is held on the vertical wall of the test stand and is of little significance for the acoustic and aerodynamic measurements and the detection of performance in the flow duct located downstream of the fan and remains substantially unchanged for testing the fan under different test conditions and also for different configurations of fans. Said static basic structure comprises a supporting housing 1 which consists of three concentrically arranged supporting rings 3 to 5 connected via ribs 2, and is connected fixedly via the outer supporting ring 3 to the vertical test stand wall 6. An outer supporting tube 7 is fastened to the central supporting ring 4 and an inner supporting tube 8 is fastened to the inner supporting ring 5. The outer and the inner supporting tube 7, 8 are connected to each other on the free end side via a multiplicity of supporting vanes 9 and a bearing ring 10 adjoining the inner supporting tube 8. Respective bearing rings 11 are attached to the inner circumference of the inner supporting tube 8 in the front and rear regions. A drive shaft 13 which is supported in bearings 12 and is connected releasably to the fan wheel 14 and at the rear end to a drive (not illustrated) is arranged concentrically in the above-described supporting structure.

The fan wheel 14 together with the fan vanes 15 which are fastened thereto and with the inlet cone 16 forms the fan 17 which is part of the mobile or interchangeable structure of the test device and the acoustic and aerodynamic behavior of which in conjunction with the flow ducts adjoining downstream of the fan, in particular the bypass flow duct 45 and the internal components assigned thereto, is to be tested.

The interchangeable part of the test device is designed to correspond to the fan to be tested in each case and to the different testing conditions required in each case, and therefore, owing to the invariable basic structure, different fan configurations can be tested under certain conditions with comparatively little outlay. Said individually designed part of the test device consists of a plurality of mobile outer housing modules which are connected to one another in a sealing manner via sealing elements 27, 50 and—arranged in a row axially in the flow direction—comprise a fan housing module 18 arranged in the region of the fan 17, a first measuring housing module 19 arranged in the guide vane region of the flow duct adjoining the fan, first to third consecutive, conically widening flow duct modules 20, 21 and 22, a second measuring housing module 23 and a fourth, conically widening flow duct module 24. The fan housing module 18 and the first measuring housing module 19 and the second measuring housing module 23 are held—in an adjustable manner in the X, Y and Z directions—on bearing pillars 25 which are held displaceably in the axial direction in guide rails 26 connected integrally to the supporting housing 1. The first to third flow duct modules 20 to 22 are screwed to one another and to the first measuring housing module 19. The fourth flow duct module 24 is screwed to the supporting housing 1, which is installed fixedly on the wall 6 of the test stand and forms a stationary outer housing section, and is sealed off from said supporting housing by a sealing element 27 (O ring). In order to compensate for expansion—the compensation being required owing to temperature fluctuations—the third and fourth flow duct modules 22 and 24 are mounted in a floating manner on the second measuring housing module 23 via a sliding seat and a seat and a special sealing element 50. The sealing element 50 is a cross-sectionally C-shaped sealing ring 50a with a spiral spring 50b which is arranged therein and expands owing to spring prestressing, and therefore the sealing ring 50a can follow the temperature-induced radial expansion of the outer housing.

The first measuring housing module 19 and the second measuring housing module 23 each have front and rear flanges 28 to 31, on the upper outer edge of which a pair of optical lenses 32, which are offset with respect to one another at an angle of 120° and each have cross hairs, are positioned in each case. Two further optical lenses 32 are attached in the same position to the stationary supporting housing 1 opposite precision telescopes 33 fastened to the fan housing module 18 at flanges 51. (The arrangement of the precision telescopes and optical lenses in which they are offset by 120° is not illustrated in the drawing). With the aid of the precision telescopes 33 and the optical lenses 32 provided on the supporting housing 1, first of all the fan housing module 18 which is adjustable in the X, Y and Z directions on the bearing pillars is aligned concentrically with respect to the center axis 34 and drive shaft 13. Subsequently, the other outer housing modules which are held on the bearing pillars 25 and are adjustable and to which the optical lenses 32 are attached are also aligned coaxially along the optical axes 35, and therefore the interchangeable part of the test device is aligned concentrically with respect to the stationary basic structure thereof with great accuracy.

The first measuring housing module 19 and the second measuring housing module 23 have a respective pivotable drum 36, 37 to which a rake 38, 39, which is equipped with microphones for measuring the sound emission, is attached interchangeably to measure the sound emission. Further microphones 40 are fastened to the pivotable drum 37 of the measuring housing module 23.

Bypass flow guide vanes 41, which are connected to an outer and an inner tube element 43, 44 via first and second core flow guide vanes 42, are held on the first measuring housing module 19, and therefore the flow duct located downstream of the fan 17 is divided into a bypass flow duct 45—which is delimited by the outer housing and the outer tube element 43 and the outer supporting tube 7—and a core flow duct 46 which is formed by the outer and inner tube elements 43, 44 and by the supporting tubes 7, 8. The outer and inner tube elements 43, 44 are held in a sealing and releaseable manner with an axial and radial gap via sealing rings 47 on the bearing structure 10, which is connected to the supporting vanes 9, and—together with the bypass flow and core flow guide vanes 41, 42—form a mobile, interchangeable test device component designed for the particular application. That is to say, the bypass flow and the core flow guide vanes 41, 42 are held only on the outer housing independently of the static basic structure and the drive shaft 13 and can be freely configured and interchanged.

Furthermore, a variable component which is interchangeable for different use situations is the acoustic liner 48 which is arranged in the bypass flow duct 45. Instead of or in combination with the acoustic liner, an aerodynamic liner can also be provided for aerodynamic investigations. Owing to the modularly designed outer housing, these components can also be interchanged with comparatively little outlay. The acoustic liner 48 consists of liner segments in the form of half shells, wherein the liner segments which are consecutive in the circumferential direction and in the flow direction and are arranged flush with respect to one another are connected to one another by a pin and socket combination (not illustrated). This enables rapid and uncomplicated changing of the acoustic liner 48 and the faults present on the surface of the acoustic liner are restricted to the peripheral joint seams running axially between the liner segments. In the present embodiment, the liner segments are adhesively bonded to the outer circumference of the bypass flow duct 45 and are supported on the inner circumference thereof via adaptor elements 49. An acoustic liner 48 formed from interchangeable liner segments is also provided on the inner circumferential surface of the fan housing module 18 upstream and downstream of the fan 17.

The measured values detected in the bypass flow duct 45 are transmitted with a telemetry unit (not illustrated) which is likewise designed as a modular (plug-in) system.

With the above-described test device which is formed in a modular manner from a stationary basic structure for supporting the drive shaft 13 driving the fan 17 and from mobile outer housing modules having interchangeable internal components, investigations with regard to the performance and the sound emission in relation to the fan and the design of the flow duct present downstream of the fan are possible with comparatively little structural outlay or said investigations comprising structural modifications. The changing of the internal components and the reassembly of the outer housing modules, which can be adjusted in the X, Y and Z directions on bearing pillars and can be oriented precisely with respect to one another by an optical system is associated with a comparatively low outlay on time in comparison to a new construction. The interchanging of the outer housing modules for newly produced outer housing modules is also associated with a significantly lower outlay than the complete remodeling of the test device.

LIST OF REFERENCE NUMBERS

1 Supporting housing
2 Ribs of 1
3 Supporting ring of 1
4 Supporting ring of 1
5 Supporting ring of 1
6 Test stand wall
7 Outer supporting tube
8 Inner supporting tube
9 Supporting vanes
10 Bearing structure
11 Bearing ring
12 Bearing
13 Drive shaft
14 Fan wheel
15 Fan vanes
16 Inlet cone
17 Fan
18 Fan housing module
19 First measuring housing module
20 First flow duct module
21 Second flow duct module
22 Third flow duct module
23 Second measuring housing module
24 Fourth flow duct module
25 Bearing pillars
26 Guide rails
27 Sealing element
28 Front flange of 19
29 Rear flange of 19
30 Front flange of 23
31 Rear flange of 23
32 Optical lenses
33 Precision telescope
34 Center axis
35 Optical axis
36 Pivotable drum
37 Pivotable drum
38 Rake
39 Rake
40 Microphones
41 Bypass flow guide vanes
42 Core flow guide vanes
43 Outer tube element
44 Inner tube element
45 Bypass flow duct
46 Core flow duct
47 Sealing ring
48 Acoustic liner
49 Adapter elements
50 Special sealing element
50a C-shaped sealing ring
50b Spiral spring
51 Flanges of 18

The invention claimed is:

1. A test device for the fan of an aircraft engine for determining the acoustic and aerodynamic behavior and the performance data, the test device comprising an outer housing which is attached on the end side to a test stand wall (6) and is intended for receiving the fan (17) and a drive shaft (13) connected to the latter, characterized by a stationary, inner basic structure (1, 7 to 11) which is designed as a cantilever support held on the test stand wall (6) and is intended for supporting the drive shaft (13);

a plurality of mobile and interchangeable outer housing modules (18 to 24) which are connected releaseably and in a sealing manner to one another, some of which are supported on the floor, and which are adjustable in the X, Y and Z directions and can be aligned coaxially with respect to one another by means of an optical device;

internal components (41 to 44) which are arranged interchangeably in the interior of the outer housing and are intended for transferring the air flow generated by the fan (17) to a bypass and a core flow duct (45, 46) and as an acoustic and/or aerodynamic liner (48) of the bypass flow duct (45); and measuring devices (38 to 40) which are arranged interchangeably in the bypass flow duct (45) and are connected to a telemetry unit of modular design.

2. The test device as claimed in claim 1, characterized in that the stationary basic structure comprises a supporting housing (1) which consists of three concentrically arranged supporting rings (3 to 5), is fastened to the test stand wall (6) and has an outer supporting tube (7) and an inner supporting tube (8) protruding from the inner supporting rings (4, 5) of said supporting housing, and the drive shaft (13) being supported on the inner supporting tube (8) via a bearing structure (10) and bearing rings (11) and also bearings (12), the free ends of the supporting tubes (7, 8) being connected to one another and to the bearing structure (10) via supporting vanes (9), and the outer supporting ring (3) of the supporting housing (1) forming a stationary part of the outer housing.

3. The test device as claimed in claim 1, characterized in that the mobile part of the outer housing comprises a fan housing module (18) and at least one measuring housing module (19, 23) which is provided with measuring means for detecting the acoustic and aerodynamic behavior and the performance of the fan (17) in conjunction with the internal components adjoining downstream, said measuring housing modules being fastened adjustably in the X, Y and Z directions to bearing pillars (25), and also comprises flow duct modules (20 to 22, 24) which are fastened between the measuring housing modules (19, 23) and the supporting housing (1) and directly to the latter, with at least one flow duct module being mounted in a sealing manner in a sliding seat to compensate for expansion.

4. The test device as claimed in claim 3, characterized in that the bearing pillars (25) are arranged displaceably in guide rails (26) attached integrally to the supporting housing (1) of the test stand.

5. The test device as claimed in claim 3, characterized by a first measuring housing module (19) adjoining the fan housing module (18) and by a second measuring housing module (23) with first to third flow duct modules (20 to 22) arranged between said measuring housing modules, and a fourth flow duct module (24) arranged between the second measuring housing module (23) and the supporting housing (1), with the third and fourth flow duct modules (22, 24) being held on the second measuring housing module (23) in sliding seats, which are sealed via C-shaped sealing rings (50a) having an inner spiral spring (50b), to compensate for expansion.

6. The test device as claimed in claim 3, characterized in that drums (36, 37) which can each be pivoted between flanges (28 to 31) on the measuring housing modules (19, 23) are provided with rakes (38, 39) and microphones (40) which are attached interchangeably to said drums and are equipped with sensors.

7. The test device as claimed in claim 1, characterized in that the internal components arranged in the interior of the outer housing comprise bypass flow guide vanes (41) which are held on the first measuring housing module (19) and are connected to an outer tube element (43) and, via core flow guide vanes (42) to an inner tube element (44), the bypass flow guide vanes (41) and the core flow guide vanes (42) being non-supporting structures which are attached only to the outer housing irrespective of the mounting of the rotor.

8. The test device as claimed in claim 7, characterized in that the tube elements (43, 44) which are supported on the supporting vanes (9) and on the bearing structure (10) together with the supporting tubes (7, 8) of the stationary basic structure form a core flow duct (46) while a bypass flow duct (45) is formed between the outer tube element (43) and the adjoining, outer supporting tube (7), on the one hand, and the inner surface of the measuring housing modules (19, 23), the flow duct modules (20 to 22, 24) and the supporting housing (1), on the other hand.

9. The test device as claimed in claim 1, characterized in that the acoustic or aerodynamic liner (48) consists of liner segments which are positioned on the inner and outer circumferences of the bypass flow duct (45), are in the form of half shells and are connected to one another in a manner joined flush to one another.

10. The test device as claimed in claim 9, characterized in that the liner segments for the acoustic liner (48) are attached to the inner surface of the fan housing module (18) upstream and downstream of the fan (17).

11. The test device as claimed in claim 1, characterized in that two precision telescopes (33) are attached to the outer circumference of the fan housing module (18), said precision telescopes being offset with respect to each other at a certain angle, in order to adjust a respective optical axis (35) which is parallel to the center axis (34), are each aligned with an optical lens (32) attached to the supporting housing (1) in the same position, and in that two optical lenses (32) which are offset at the same angle in the circumferential direction are likewise attached in each case to the front and rear flanges (28, 29; 30, 31) of the measuring housing modules (19, 23), which are supported adjustably on the floor side on the bearing pillars (25), in order to be able to align the measuring housing modules (19, 23) along the optical axis (35).

\* \* \* \* \*